(12) United States Patent
Luo

(10) Patent No.: US 10,893,137 B2
(45) Date of Patent: Jan. 12, 2021

(54) PHOTOGRAPHY GUIDING METHOD, DEVICE, AND SYSTEM

(71) Applicant: HUAWEI TECHNOLOGIES CO., LTD., Guangdong (CN)

(72) Inventor: Yi Luo, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/496,148

(22) PCT Filed: May 31, 2017

(86) PCT No.: PCT/CN2017/086723
§ 371 (c)(1),
(2) Date: Sep. 20, 2019

(87) PCT Pub. No.: WO2018/171047
PCT Pub. Date: Sep. 27, 2018

(65) Prior Publication Data
US 2020/0045165 A1 Feb. 6, 2020

(30) Foreign Application Priority Data
Mar. 21, 2017 (CN) .......................... 2017 1 0170221

(51) Int. Cl.
*H04M 1/725* (2006.01)
*G06F 16/583* (2019.01)
(Continued)

(52) U.S. Cl.
CPC ...... *H04M 1/72586* (2013.01); *G06F 16/583* (2019.01); *G06F 16/587* (2019.01);
(Continued)

(58) Field of Classification Search
CPC .......... H04M 1/72586; H04M 1/72572; H04N 5/232939; H04N 5/232933; G06F 16/583; G06F 16/587; G06F 16/5866
(Continued)

(56) References Cited

U.S. PATENT DOCUMENTS

2001/0048815 A1 12/2001 Nakajima et al.
2009/0027732 A1* 1/2009 Imai .......................... G06T 5/00
358/3.27
(Continued)

FOREIGN PATENT DOCUMENTS

CN 103401994 A 11/2013
CN 103929596 A 7/2014
(Continued)

OTHER PUBLICATIONS

Office Action dated Sep. 27, 2019, issued in counterpart CN Application No. 201780011875.3, with English translation (15 pages).
(Continued)

*Primary Examiner* — Yuwen Pan
*Assistant Examiner* — Angelica M Perez
(74) *Attorney, Agent, or Firm* — Westerman, Hattori, Daniels & Adrian, LLP

(57) ABSTRACT

Embodiments of this application provide a photography guiding method, a device, and a system, relate to the field of terminal technologies, so as to precisely search for a reference picture by using a search word, and accurately guide a user based on the reference picture to perform composition photographing, thereby improving user photographing experience. A specific solution includes: displaying, by a photographing device, a photographing screen; when detecting at least one search word entered by a user on the photographing screen, performing picture retrieval based on the search
(Continued)

word, where the at least one search word is used to describe a feature of a to-be-photographed picture; and displaying, on the photographing screen, at least one reference picture in a retrieved picture, where the reference picture is used to guide the user to perform composition photographing. The embodiments of this application are used to guide the user to perform composition photographing.

20 Claims, 16 Drawing Sheets

(51) Int. Cl.
    *G06F 16/58*     (2019.01)
    *H04N 5/232*     (2006.01)
    *G06F 16/587*     (2019.01)

(52) U.S. Cl.
    CPC .... *G06F 16/5866* (2019.01); *H04M 1/72572* (2013.01); *H04N 5/232933* (2018.08); *H04N 5/232939* (2018.08)

(58) Field of Classification Search
    USPC .......................................................... 455/566
    See application file for complete search history.

(56) References Cited

U.S. PATENT DOCUMENTS

| | | | |
|---|---|---|---|
| 2012/0301113 A1* | 11/2012 | Yamamoto | H04N 1/3876 386/280 |
| 2013/0086105 A1* | 4/2013 | Hammontree | G06K 9/46 707/769 |
| 2016/0006945 A1 | 1/2016 | Furuhashi | |
| 2017/0032190 A1 | 2/2017 | Sato et al. | |

FOREIGN PATENT DOCUMENTS

| | | | |
|---|---|---|---|
| CN | 103957354 A | | 7/2014 |
| CN | 104301613 A | | 1/2015 |
| CN | 104935810 A | | 9/2015 |
| CN | 105052123 A | | 11/2015 |
| CN | 105320242 | * | 2/2016 |
| CN | 105320242 A | | 2/2016 |
| CN | 106233283 A | | 12/2016 |
| JP | 2009239397 A | | 10/2009 |

OTHER PUBLICATIONS

International Search Report and Written Opinion dated Nov. 30, 2017, issued in counterpart Application No. PCT/CN2017/086723, with English translation. (19 pages).

Extended (Supplementary) European Search Report dated Feb. 24, 2020, issued in counterpart application No. 17901520.1. (11 pages).

* cited by examiner

PHOTOGRAPHY GUIDING METHOD, DEVICE, AND SYSTEM

CROSS-REFERENCE TO RELATED APPLICATIONS

This application is a national stage of International Application No. PCT/CN2017/086723, filed on May 31, 2017, which claims priority to Chinese Patent Application No. 201710170221.7, filed on Mar. 21, 2017. Both of the aforementioned applications are hereby incorporated by reference in their entireties.

TECHNICAL FIELD

Embodiments of this application relate to the field of terminal technologies, and in particular, to a photography guiding method, a device, and a system.

BACKGROUND

In recent years, people impose a higher requirement on a photographing function of a mobile phone, and how to photograph a better and more professional picture by improving a composition mode is an important issue in mobile phone photographing.

In the prior art, to guide a user in composition, a mobile phone generates composition data by identifying image information in a viewfinder frame, and then searches for and obtains composition scheme data based on the composition data, so as to prompt, based on the composition scheme data, the user to adjust a location to take a photo.

This implementation mainly depends on an image recognition technology, but recognition accuracy of architecture, people, vegetation, and other types is relatively low in the current intelligent image recognition technology. Consequently, precise recognition is difficult to implement, and there is a relatively large difference between found composition scheme data and a photographed object, thereby causing poor user experience.

SUMMARY

Embodiments of this application provide a photography guiding method, a device, and a system, so as to precisely search for a reference picture by using a search word, and accurately guide a user based on the reference picture to perform composition photographing, thereby improving user photographing experience.

To achieve the foregoing objective, the embodiments of this application provide the following technical solutions:

According to a first aspect, an embodiment of this application provides a photography guiding method, including: first, displaying, by a photographing device, a photographing screen; then, when detecting at least one search word entered by a user on the photographing screen, performing, by the photographing device, picture retrieval based on the search word, where the at least one search word is used to describe a feature of a to-be-photographed picture; and further, displaying, by the photographing device on the photographing screen, at least one reference picture in a retrieved picture, where the reference picture is used to guide the user to perform composition photographing.

In this way, the photographing device can detect, on the photographing screen, the search word that is used to describe the feature of the to-be-photographed picture and that is entered by the user, so as to precisely search for the reference picture based on the search word, and further accurately guide the user based on the reference picture to perform composition photographing.

With reference to the first aspect, in a possible implementation, the feature of the to-be-photographed picture includes at least one of a feature of a photographed object, a photographing location, a photographing time, and a photographing scene, and the feature of the photographed object includes at least one of a type, a quantity, and a state of the photographed object.

In this way, the photographing device can more precisely search for the reference picture based on a more detailed and more specific feature such as the type, the quantity, or the state of the photographed object, the photographing location, the photographing time, or the photographing scene that is described by the search word, so as to more accurately guide the user to perform composition.

With reference to the first aspect and the foregoing possible implementation, in another possible implementation, before the detecting, by the photographing device, at least one search word entered by a user on the photographing screen, the method further includes: detecting, by the photographing device, first instruction information triggered by the user, where the first instruction information is used to select an input mode of the at least one search word, the input mode includes manual input and voice input, and the manual input includes at least one of a 9-key Pinyin input, a QWERTY Pinyin input, a handwriting input, and a Wubi input; and selecting, by the photographing device, the input mode in response to the first instruction information.

In this way, the photographing device can flexibly switch an input method on the photographing screen, so that the user can enter the search word more conveniently by using different input modes.

With reference to the first aspect and the foregoing possible implementations, in another possible implementation, before the displaying, by the photographing device on the photographing screen, at least one reference picture in a retrieved picture, the method further includes: detecting, by the photographing device, second instruction information triggered by the user, where the second instruction information is used to select at least one picture type; and after the photographing device detects the second instruction information, the displaying, at least one reference picture on the photographing screen includes: displaying at least one reference picture that matches the selected picture type on the photographing screen.

In this way, the photographing device can display only a reference picture of a specific picture type on the photographing screen.

With reference to the first aspect and the foregoing possible implementations, in another possible implementation, after the displaying at least one reference picture on the photographing screen, the method further includes: detecting, by the photographing device, second instruction information triggered by the user, where the second instruction information is used to select at least one picture type; and after detecting the second instruction information, adjusting, by the photographing device, the at least one reference picture displayed on the photographing screen, so that adjusted reference picture displayed on the photographing screen matches the selected picture type.

In this way, the photographing device can display, on the photographing screen, the reference picture of the picture type selected by the user.

With reference to the first aspect and the foregoing possible implementations, in another possible implementation, the feature of the to-be-photographed picture further includes a picture type.

In this way, the user can directly search for a desired picture type by using the search word, so that a reference picture corresponding to the desired picture type is displayed on the photographing screen.

With reference to the first aspect and the foregoing possible implementations, in another possible implementation, the method further includes: detecting, by the photographing device, third instruction information triggered by the user, where the third instruction information is used to instruct to change the reference picture displayed on the photographing screen; and changing, by the photographing device in response to the third instruction information, the reference picture displayed on the photographing screen.

In this way, the reference picture displayed on the photographing screen is changed, and more reference pictures can be presented to the user.

With reference to the first aspect and the foregoing possible implementations, in another possible implementation, the reference picture displayed on the photographing screen is corresponding to a same picture type, and the third instruction information is used to instruct to change the reference picture displayed on the photographing screen to a reference picture corresponding to another picture type.

In this way, each time the displayed reference picture is changed, another picture type of reference picture may be presented to the user for reference.

With reference to the first aspect and the foregoing possible implementations, in another possible implementation, the method further includes: detecting, by the photographing device, fourth instruction information triggered by the user, where the fourth instruction information is used to instruct to select one of the at least one reference picture displayed on the photographing screen as a target reference picture; and after detecting the fourth instruction information, zooming in and displaying, by the photographing device, the target reference picture; or after detecting the fourth instruction information, covering, by the photographing device, the target reference picture on a framed picture in a translucent manner; or after detecting the fourth instruction information, covering, by the photographing device, a picture contour of the target reference picture on a framed picture.

In this way, the target reference picture can be displayed or compared with the framed picture more clearly, visually, and prominently, so that the user can more conveniently and clearly make reference to a composition mode of the target reference picture, and perform composition photographing.

With reference to the first aspect and the foregoing possible implementations, in another possible implementation, the method further includes: automatically photographing, by the photographing device, a picture when the framed picture matches the target reference picture.

In this way, intelligence of the photographing device can be improved, and user experience can be improved.

With reference to the first aspect and the foregoing possible implementations, in another possible implementation, that the framed picture matches the target reference picture includes that a similarity between a picture contour of the framed picture and the picture contour of the target reference picture is greater than a preset value.

In this way, when the picture contour of the framed picture is relatively similar to the picture contour of the target reference picture, it may be considered that the framed picture matches the target reference picture.

With reference to the first aspect and the foregoing possible implementations, in another possible implementation, the method further includes: feeding back, by the photographing device, identification information of the target reference picture to a retrieval database.

In this way, the retrieval database can collect data statistics and perform service push more conveniently.

With reference to the first aspect and the foregoing possible implementations, in another possible implementation, the displaying, by the photographing device on the photographing screen, at least one reference picture in a retrieved picture includes: arranging and displaying, by the photographing device, the at least one reference picture on the photographing screen based on a priority sequence, where a priority of a reference picture is proportional to a quantity of times that the reference picture is selected as the target reference picture.

In this way, the photographing device can preferably display a reference picture that is more frequently selected as the target reference picture.

With reference to the first aspect and the foregoing possible implementations, in another possible implementation, the displaying, by the photographing device on the photographing screen, at least one reference picture in a retrieved picture includes: arranging and displaying, by the photographing device, the reference picture based on a priority sequence, where a reference picture corresponding to a more recent photographing date has a higher priority.

In this way, the photographing device can preferably display a "newer" reference picture for user reference.

With reference to the first aspect and the foregoing possible implementations, in another possible implementation, first global positioning system (global positioning system, GPS) information is displayed on the target reference picture, and second GPS information is displayed on the photographing screen, the first GPS information is photographing location information of the target reference picture, the second GPS information is location information of the photographing device, and the method further includes: when the second GPS information matches the first GPS information, displaying, by the photographing device, prompt information and/or photographing, by the photographing device, a picture.

In this way, the user can perform composition photographing based on a location specified by GPS information.

According to a second aspect, an embodiment of this application provides a photographing device, including: a display screen, configured to display a photographing screen; a detection unit, configured to detect at least one search word entered by a user on the photographing screen, where the at least one search word is used to describe a feature of a to-be-photographed picture; and a retrieval unit, configured to perform picture retrieval based on the search word detected by the detection unit, where the display screen is further configured to display, on the photographing screen, at least one reference picture in a retrieved picture, where the reference picture is used to guide the user to perform composition photographing.

With reference to the second aspect, in a possible implementation, the feature of the to-be-photographed picture includes at least one of a feature of a photographed object, a photographing location, a photographing time, and a photographing scene, and the feature of the photographed object includes at least one of a type, a quantity, and a state of the photographed object.

With reference to the second aspect and the foregoing possible implementation, in another possible implementation, before detecting the at least one search word entered by the user on the photographing screen, the detection unit is further configured to detect first instruction information triggered by the user, where the first instruction information is used to select an input mode of the at least one search word, the input mode includes manual input and voice input, and the manual input includes at least one of a 9-key Pinyin input, a QWERTY Pinyin input, a handwriting input, and a Wubi input; and the photographing device further includes a processing unit, configured to select the input mode in response to the first instruction message detected by the detection unit.

With reference to the second aspect and the foregoing possible implementations, in another possible implementation, before the display screen displays, on the photographing screen, the at least one reference picture in the retrieved picture, the detection unit is further configured to detect second instruction information triggered by the user, where the second instruction information is used to select at least one picture type; and after the detection unit detects the second instruction information, that the display screen displays, on the photographing screen, at least one reference picture in a retrieved picture includes: displaying at least one reference picture that matches the selected picture type on the photographing screen.

With reference to the second aspect and the foregoing possible implementations, in another possible implementation, after the display screen displays, on the photographing screen, the at least one reference picture in the retrieved picture, the detection unit is further configured to detect second instruction information triggered by the user, where the second instruction information is used to select at least one picture type; and the processing unit is further configured to: after the detection unit detects the second instruction information, adjust the at least one reference picture displayed on the photographing screen, so that adjusted reference picture displayed on the photographing screen matches the selected picture type.

With reference to the second aspect and the foregoing possible implementations, in another possible implementation, the feature of the to-be-photographed picture further includes a picture type.

With reference to the second aspect and the foregoing possible implementations, in another possible implementation, the detection unit is further configured to detect third instruction information triggered by the user, where the third instruction information is used to instruct to change the reference picture displayed on the photographing screen; and the processing unit is further configured to change, in response to the third instruction information detected by the detection unit, the reference picture displayed on the photographing screen.

With reference to the second aspect and the foregoing possible implementations, in another possible implementation, the reference picture displayed on the photographing screen is corresponding to a same picture type, and the third instruction information is used to instruct to change the reference picture displayed on the photographing screen to a reference picture corresponding to another picture type.

With reference to the second aspect and the foregoing possible implementations, in another possible implementation, the detection unit is further configured to detect fourth instruction information triggered by the user, where the fourth instruction information is used to instruct to select one of the at least one reference picture displayed on the photographing screen as a target reference picture; and the processing unit is further configured to: after the detection unit detects the fourth instruction information, zoom in and display the target reference picture; or cover the target reference picture on a framed picture in a translucent manner; or cover a picture contour of the target reference picture on a framed picture.

With reference to the second aspect and the foregoing possible implementations, in another possible implementation, the processing unit is further configured to photograph a picture when the framed picture matches the target reference picture.

With reference to the second aspect and the foregoing possible implementations, in another possible implementation, that the framed picture matches the target reference picture includes that a similarity between a picture contour of the framed picture and the picture contour of the target reference picture is greater than a preset value.

With reference to the second aspect and the foregoing possible implementations, in another possible implementation, the terminal further includes a feedback unit, configured to feed back identification information of the target reference picture to a retrieval database.

With reference to the second aspect and the foregoing possible implementations, in another possible implementation, that the display screen is configured to display, on the photographing screen, at least one reference picture in a retrieved picture includes: arranging and displaying the at least one reference picture on the photographing screen based on a priority sequence, where a priority of a reference picture is proportional to a quantity of times that the reference picture is selected as the target reference picture.

With reference to the second aspect and the foregoing possible implementations, in another possible implementation, first global positioning system GPS information is displayed on the target reference picture, second GPS information is displayed on the photographing screen, the first GPS information is photographing location information of the target reference picture, the second GPS information is location information of the photographing device, and the display screen is further configured to: when the second GPS information matches the first GPS information, display prompt information and/or photograph a picture.

According to a third aspect, an embodiment of this application provides a photography guiding method, including: receiving, by a server, at least one search word sent by a photographing device, where the at least one search word is used to describe a feature of a to-be-photographed picture; then, performing, by the server, picture retrieval based on the search word; and further sending, by the server, a retrieved picture to the photographing device, where the picture is used to provide a reference picture for guiding a user to perform composition photographing.

In this way, the server can accurately search for pictures based on the search word sent by the photographing device, and send the pictures to the photographing device, so as to provide a reference picture, and guide the user to perform composition photographing by using the reference picture.

According to a fourth aspect, an embodiment of this application provides a server, and the server includes: a receiving unit, configured to receive at least one search word sent by a photographing device, where the at least one search word is used to describe a feature of a to-be-photographed picture; a retrieval unit, configured to perform picture retrieval based on the search word; and a sending unit, configured to send a retrieved picture to the photographing device, where the picture is used to provide a reference picture for guiding a user to perform composition photographing.

According to a fifth aspect, an embodiment of the present invention provides a photographing device, including: a processor, a memory, a bus, and a communications interface, where the processor and the memory are connected by using the bus, the memory is configured to store a computer-executable instruction, and when the photographing device runs, the processor executes the computer-executable instruction stored in the memory, so that the photographing device performs the photography guiding method in any one of the possible implementations of the first aspect.

According to a sixth aspect, an embodiment of this application provides a computer readable storage medium, configured to store a computer software instruction used by the foregoing photographing device, and when the computer software instruction runs on a computer, the computer can perform the photography guiding method in any one of the possible implementations of the first aspect.

According to a seventh aspect, an embodiment of this application provides a computer program product that includes an instruction, and when the computer program product runs on a computer, the computer can perform the photography guiding method in any one of the possible implementations of the first aspect.

According to an eighth aspect, an embodiment of this application provides a system, and the system may include the photographing device in any one of the possible implementations of the second aspect and the server in the fourth aspect.

DESCRIPTION OF EMBODIMENTS

For ease of understanding, examples of descriptions of some concepts related to the embodiments of this application are provided as follows for reference:

Composition is a form or style of combining components through an overall arrangement of picture content, a structure, a form, and the like of a picture, so that the picture is a harmonious whole.

Photographed subject is a photographed object that needs to be highlighted in a photographed picture.

Framed picture is an image or a picture presented in a viewfinder frame on a photographing screen after a photographing function is enabled.

The following describes the technical solutions in the embodiments of this application with reference to the accompanying drawings in the embodiments of this application. In descriptions of this application, unless otherwise specified, the character "/" represents the meaning of "or", for example, A/B may represent A or B; and the term "and/or" in this specification describes only an association relationship for describing associated objects and represents that three relationships may exist. For example, A and/or B may represent the following three cases: Only A exists, both A and B exist, and only B exists. In addition, in the descriptions of this application, "a plurality of" means two or more than two.

When a user opens a photographing screen of a photographing device and prepares for photographing a picture, to better guide the user to perform composition photographing, the embodiments of this application provide a photography guiding method. The photographing device detects, on the photographing screen, at least one search word that is used to describe a feature of a to-be-photographed picture and that is entered by the user, and precisely searches for a matched reference picture based on the entered search word, so as to accurately guide, based on the reference picture obtained through precisely searching, the user to perform composition photographing.

In the embodiments of this application, the photographing device may be a terminal device with a photographing function, for example, may be a terminal device such as a mobile phone, a camera, a tablet computer, an ultra-mobile personal computer (ultra-mobile personal computer, UMPC), a netbook, or a personal digital assistant (personal digital assistant, PDA). In addition, the photographing device herein may be specifically a touchscreen device, or may be a non-touchscreen device.

Specifically, in the embodiments of the present invention, an example in which the terminal device is a mobile phone is used to describe a photography guiding method provided in the present invention. The following specifically describes constituent components of a mobile phone 10 with reference to FIG. 1.

Figure 1:
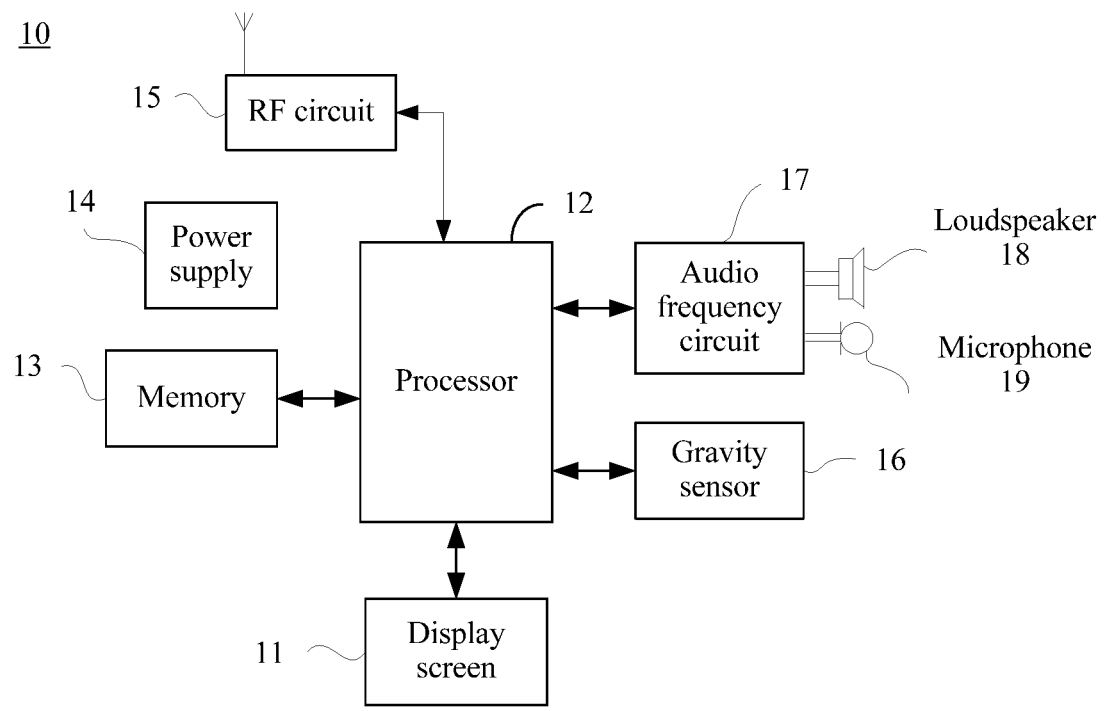
FIG. 1 is a schematic structural diagram of a mobile phone according to an embodiment of this application.

As shown in FIG. 1, the mobile phone 10 may include components such as a display screen 11, a processor 12, a memory 13, a power supply 14, a radio frequency (radio frequency, RF) circuit 15, a gravity sensor 16, an audio frequency circuit 17, a loudspeaker 18, and a microphone 19. These components may be connected by using a bus, or may be directly connected. A person skilled in the art may understand that a structure of the mobile phone shown in FIG. 1 constitutes no limitation on the mobile phone, and the mobile phone may include more components than those shown in FIG. 1, or combine some components, or have different component arrangements.

The display screen 11 may be a display panel, or a touch display panel, namely, a touchscreen. When being a touchscreen, the display screen 11 may be configured to implement input and output functions of the mobile phone 10, and may collect a touch operation (for example, an operation performed by a user on or near the touchscreen by using any proper object or accessory such as a finger or a stylus) of a user on or near the touchscreen, and drive a corresponding connected apparatus according to a preset program. The display screen 11 may be further configured to display information entered by the user or information (for example, an image captured by using a camera) provided for the user, and various menus of the mobile phone. For example, the touchscreen may be implemented by using a plurality of types such as a resistive type, a capacitive type, an infrared ray, and an ultrasonic wave. This is not limited in this embodiment of the present invention. An operation of the user near the touchscreen may be referred to as floating touch, and a touchscreen on which floating touch can be performed may be implemented by using a capacitive type, an infrared ray, an ultrasonic wave, and the like.

The processor 12 is a control center of the mobile phone 10, uses various interfaces and lines to connect all components of the entire mobile phone, and performs various functions of the mobile phone 10 and processes data by running or executing a software program and/or a module that are/is stored in the memory 13 and by invoking data stored in the memory 13, so as to perform overall monitoring on the mobile phone 10. In specific implementation, in an embodiment, the processor 12 may include one or more processing units, and the processor 12 may integrate an application processor and a modem processor. The application processor mainly processes an operating system, a user interface, an application program, and the like, and the modem processor mainly processes wireless communication. It may be understood that the modem processor may be not integrated into the processor 12.

The memory 13 may be configured to store data, a software program, and a module, and may be a volatile memory (volatile memory), for example, a random access memory (random access memory, RAM); or may be a non-volatile memory (non-volatile memory), for example, a read-only memory (read-only memory, ROM), a flash memory (flash memory), a hard disk drive (hard disk drive, HDD), or a solid-state drive (solid-state drive, SSD); or may be a combination of the foregoing types of memories. Specifically, the memory 13 may store program code, and the program code is used to enable the processor 12 to perform, by executing the program code, the photographing guiding method provided in the embodiments of this application.

The power supply 14 may be a battery, and is logically connected to the processor 12 by using a power management system, to implement functions such as charging management, discharging management, and power consumption management by using the power management system.

The RF circuit 15 may be configured to receive and send information, or receive and send a signal in a call process. Particularly, the RF circuit 15 sends received information to the processor 12 for processing, and sends a signal generated by the processor 12. Generally, the RF circuit includes but is not limited to an antenna, at least one amplifier, a transceiver, a coupler, a low noise amplifier (low noise amplifier, LNA), a duplexer, or the like. In addition, the RF circuit 15 may further communicate with a network and another device through wireless communication.

The gravity sensor (gravity sensor) 16 may detect a value of acceleration in each direction (generally, three axes) of the mobile phone, may detect a value and a direction of gravity in a static mode, and may be used for an application that identifies a mobile phone gesture (such as screen orientation switching, related games, and magnetometer gesture calibration), a function related to vibration identification (such as a pedometer and a strike), and the like. It should be noted that the mobile phone 10 may further include other sensors such as a pressure sensor, an optical sensor, a gyroscope, a barometer, a hygrometer, a thermometer, and an infrared sensor. Details are not described herein.

The audio frequency circuit 17, the loudspeaker 18, and the microphone 19 may provide an audio interface between the user and the mobile phone 10. The audio frequency circuit 17 may transmit, to the loudspeaker 18, an electrical signal into which received audio data is converted, and the loudspeaker 18 converts the electrical signal into a sound signal for output. In addition, the microphone 19 converts a collected sound signal into an electrical signal, and after receiving the electrical signal, the audio frequency circuit 17 converts the electrical signal into audio data, and then transmits the audio data to the RF circuit 15, so as to send the audio data to, for example, another mobile phone, or transmits the audio data to the processor 12 for further processing.

Although not shown in the figure, the mobile phone 10 may further include a function module such as a Wireless Fidelity (Wireless Fidelity, Wi-Fi) module, a Bluetooth module, and a camera. Details are not described herein.

Figure 2:
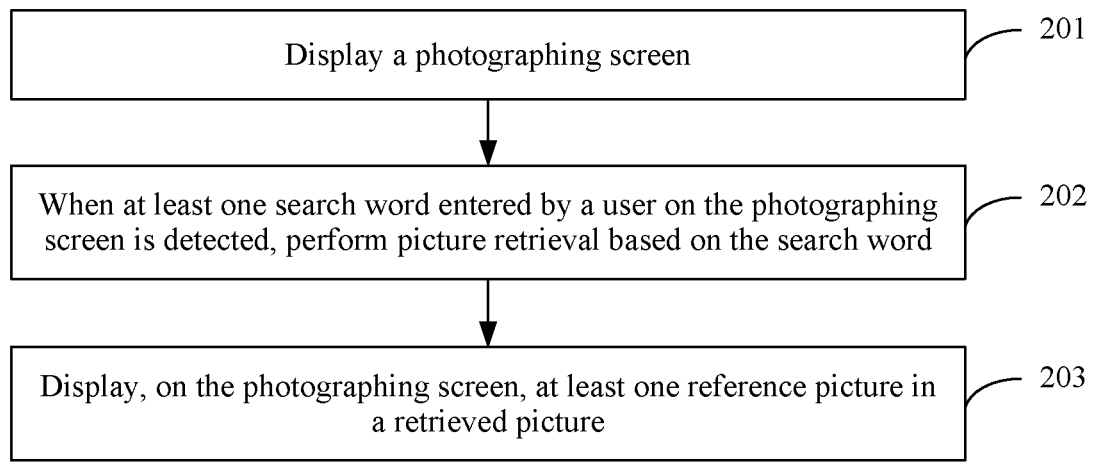
FIG. 2 is a flowchart of a photography guiding method according to an embodiment of this application.

To make the objectives, technical solutions, and advantages of the embodiments of this application clearer, with reference to the mobile phone 10 shown in FIG. 1, the following describes in detail a photography guiding method provided in the embodiments of this application by using a flowchart of the photography guiding method shown in FIG. 2. Steps shown in FIG. 2 may also be performed in any terminal device other than the touchscreen mobile phone shown in FIG. 1. In addition, although a logical sequence of the photography guiding method provided in this embodiment of this application is shown in the method flowchart, in some cases, the shown or described steps may be performed in a sequence different from the sequence herein.

Referring to FIG. 2, the photography guiding method provided in an embodiment of this application may include the following steps.

201. A photographing device displays a photographing screen.

Figure 3:
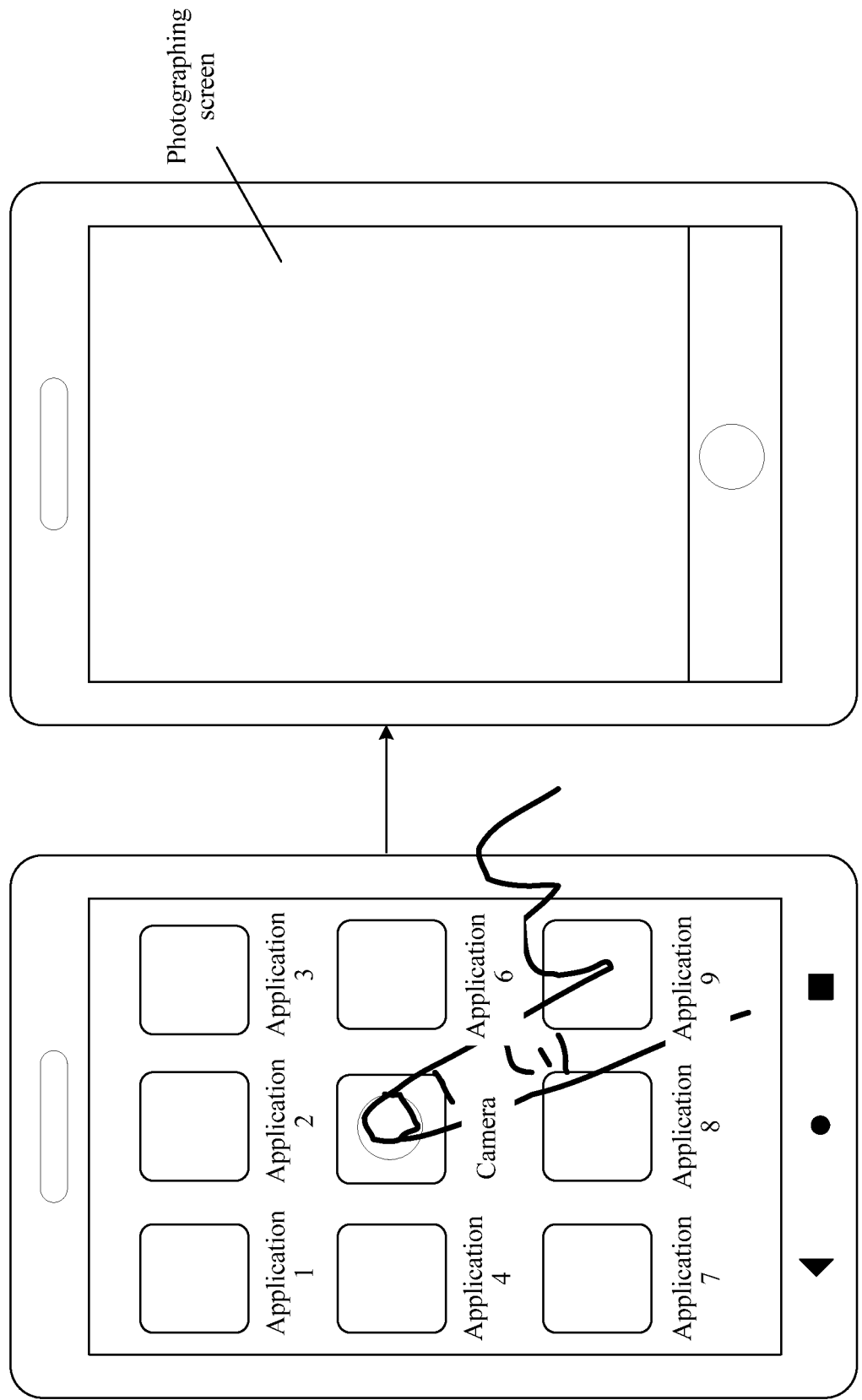
FIG. 3 is a schematic diagram of a photographing screen according to an embodiment of this application.

In the photography guiding method provided in this embodiment of this application, referring to FIG. 3, the photographing device may first enable a photographing function of a camera, and open the photographing screen.

202. When detecting at least one search word entered by a user on the photographing screen, the photographing device performs picture retrieval based on the search word, where the at least one search word is used to describe a feature of a to-be-photographed picture.

The search word herein may be a single Chinese character, a number, or an English word, or may be in a form of a word, a phrase, or the like. This is not specifically limited herein. After the photographing screen is opened, the user may enter, on the photographing screen, the at least one search word that is used to describe the feature of the to-be-photographed picture. The feature of the to-be-photographed picture is a characteristic and a property corresponding to the picture to be photographed by the user.

Figure 4:
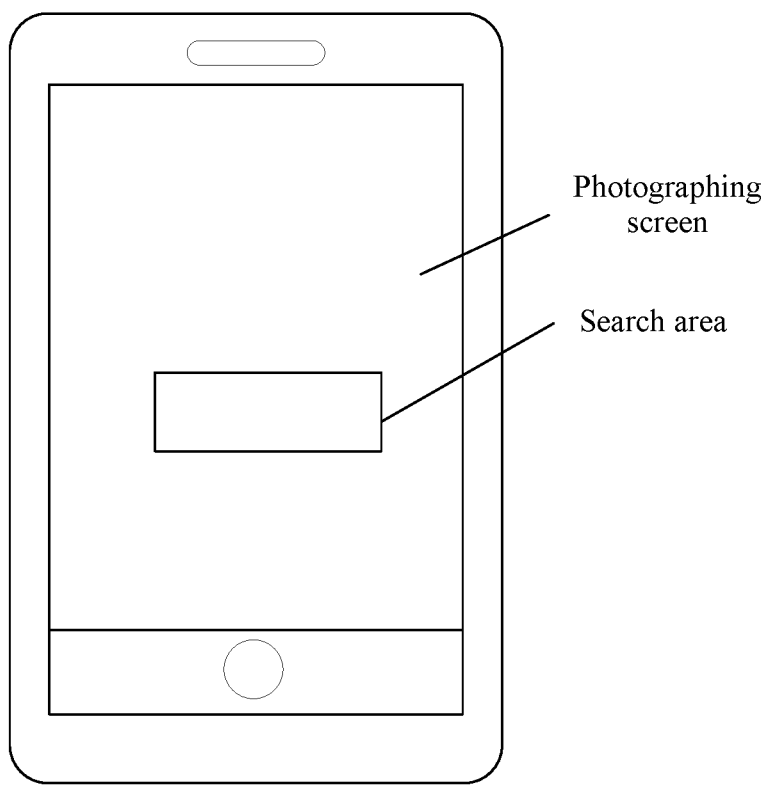
FIG. 4 is a schematic diagram of another photographing screen according to an embodiment of this application.

For example, referring to FIG. 4, the photographing screen may include a search area used to receive the search word entered by the user. After detecting, on the photographing screen, the at least one search word entered by the user, the photographing device may search for a picture that matches the search word. For example, the search word may be "Great Wall, person", in other words, the feature of the to-be-photographed picture includes that the to-be-photographed picture includes the "Great Wall" and a "person", and the user wants to photograph a picture including the "Great Wall" and a "person".

It should be noted that, when detecting the search word entered by the user, the photographing device may specifically precisely search a local database, based on the search word, for a picture that matches the feature that is of the to-be-photographed picture and that is described by the search word. Alternatively, the photographing device may send the search word to a network server, and after receiving the search word, the server precisely searches for, based on the search word, a picture matching the feature that is of the to-be-photographed picture and that is described by the search word, and sends a found picture to the photographing device.

For example, when the search word entered by the user is "person, Great Wall", a picture obtained by the server through precisely searching based on the search word may be a picture that includes a "person" and the "Great Wall".

In other words, in this embodiment of this application, the photographing device may integrate a photographing function and a search function. The photographing device may directly search for a picture on the photographing screen, and does not need to exit from the photographing screen and then perform searching in a browser or another application, thereby avoiding a switch operation between a photographing application and a search application, reducing user operation time, and improving user experience.

203. The photographing device displays, on the photographing screen, at least one reference picture in a retrieved picture, where the reference picture is used to guide the user to perform composition photographing.

Figure 5:
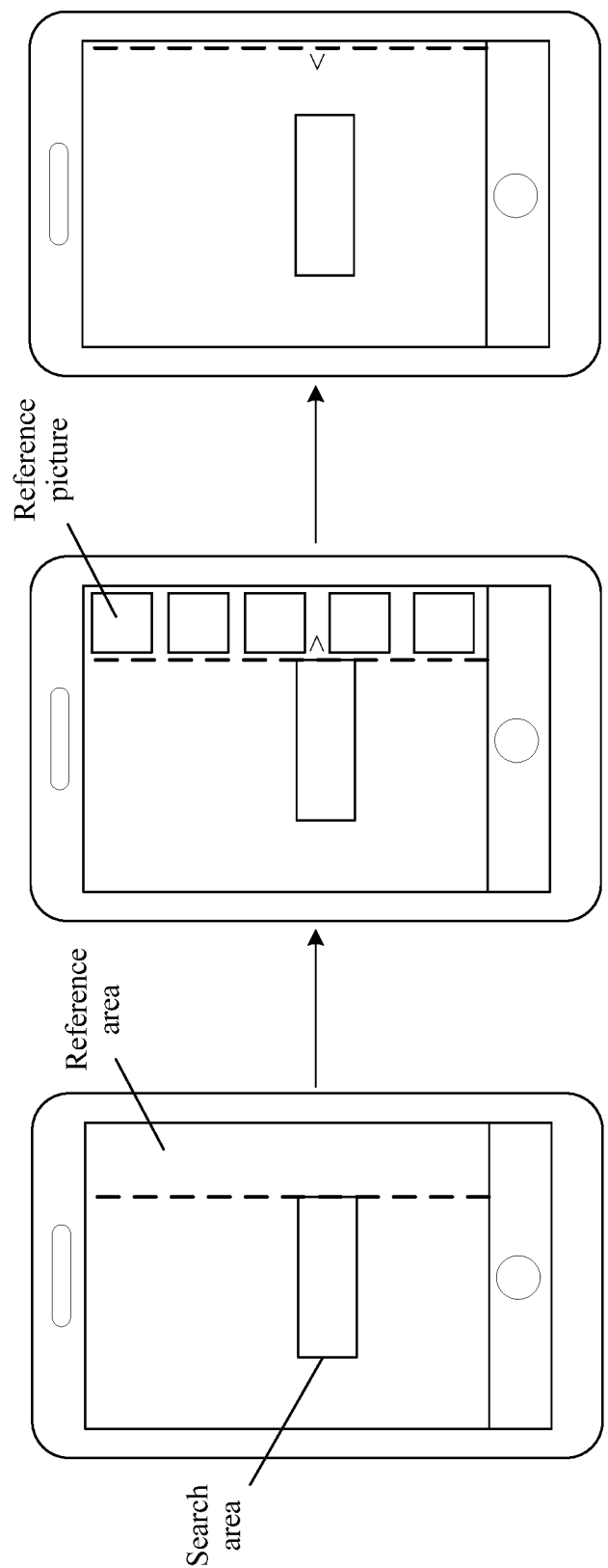
FIG. 5 is a schematic diagram of another photographing screen according to an embodiment of this application.

After pictures are retrieved, the photographing device may display, on the photographing screen, one or more reference pictures in the retrieved pictures. A specific quantity of reference pictures is not limited in this embodiment of this application. For example, referring to FIG. 5, the photographing screen may include a reference area used to display the at least one reference picture, and the reference area may be located at a right border of the photographing screen. A mark ">" may be further included on a boundary of the reference area, and when the mark is tapped, the reference picture is temporarily hidden. In this case, a mark "<" may be further displayed on the photographing screen, and when the mark is tapped, the hidden reference picture is redisplayed. Certainly, the reference area may also be located at an upper border, a left border, a lower border, side borders, or another area of the photographing screen. This is not specifically limited herein.

In this way, the user may perform composition photographing by referring to a composition node in the reference picture, so as to photograph a better and more professional picture. For example, the user may adjust a photographing location, adjust a position of a lens, adjust a depth of field, adjust a location, an action, or an expression of a photographed object, and the like by referring to the composition mode in the reference picture, to photograph a picture desired by the user.

It should be noted that, by visually displaying the reference picture on the photographing screen, the photographing device may directly, simply and efficiently guide the user to perform composition photographing.

In a possible implementation, the photographing device displays a plurality of reference pictures on the photographing screen, to provide more reference for the user. Different users may select different pictures from the plurality of reference pictures, so that the user may select one reference picture that is preferred by the user, and perform composition photographing by referring to a composition mode of the preferred reference picture. Alternatively, the user may select several preferred reference pictures, and perform composition photographing with reference to composition modes of the different reference pictures, to photograph a picture that is preferred by the user.

In the photography guiding method provided in the foregoing embodiment of this application, the photographing device may detect, on the photographing screen, the search word that is used to describe the feature of the to-be-photographed picture and that is entered by the user, so as to precisely search for the reference picture based on the search word, and further accurately guide the user based on the reference picture to perform composition photographing. Therefore, compared with the prior art in which it is difficult to accurately identify image information by using an image recognition technology and consequently composition scheme data cannot be accurately obtained, the method provided in this embodiment of this application can more precisely search for the reference picture that is used to guide the user to perform composition, thereby improving user photographing experience.

In this embodiment of this application, the feature of the to-be-photographed picture may specifically include at least one of a feature of a photographed object, a photographing location, a photographing time, and a photographing scene. For example, the photographing location may be a park or an amusement park, the photographing time may be in the morning or evening, at nightfall, or in the night, and the photographing scene may be a rainy scene, a snowy scene, or a night scene. The feature of the photographed object may include at least one of a type, a quantity, and a state of the photographed object. The photographed object is an object that the user wants to present in the to-be-photographed picture. The type of the photographed object may be a person, or may be a thing, for example, may be the Great Wall, the Mountain Hua, a brook, or a puppy. In an actual operation, the user may select one or more photographed subjects as the photographed object for searching. The quantity of photographed objects is a quantity of photographed objects that the user wants to present in the to-be-photographed picture. For example, the photographed object may be a person, and the quantity of photographed objects may be 2, which indicates that the user wants to present two persons in the to-be-photographed picture. The state of the photographed object is an action, an expression, a pose, or the like of the photographed object that the user wants to present in the to-be-photographed picture, such as jumping, chatting, thinking, smiling, a V gesture, standing, lying, or looking up.

For example, the search word in the search area of the photographing screen may be "Great Wall, two persons, V gesture, rainy scene", which indicates that a feature of a picture that the user wants to photograph (the to-be-photographed picture) is a picture including the Great Wall and two persons in the rain and at least one person making a V gesture. These search words are used to search for a picture corresponding to the picture including the Great Wall and two persons in the rain and at least one person making a V gesture.

In this way, the photographing device can more precisely search for the reference picture based on a more detailed and more specific feature such as the type, the quantity, or the state of the photographed object, the photographing location, the photographing time, or the photographing scene that is described by the search word, so as to more accurately guide the user to perform composition.

Figure 6:
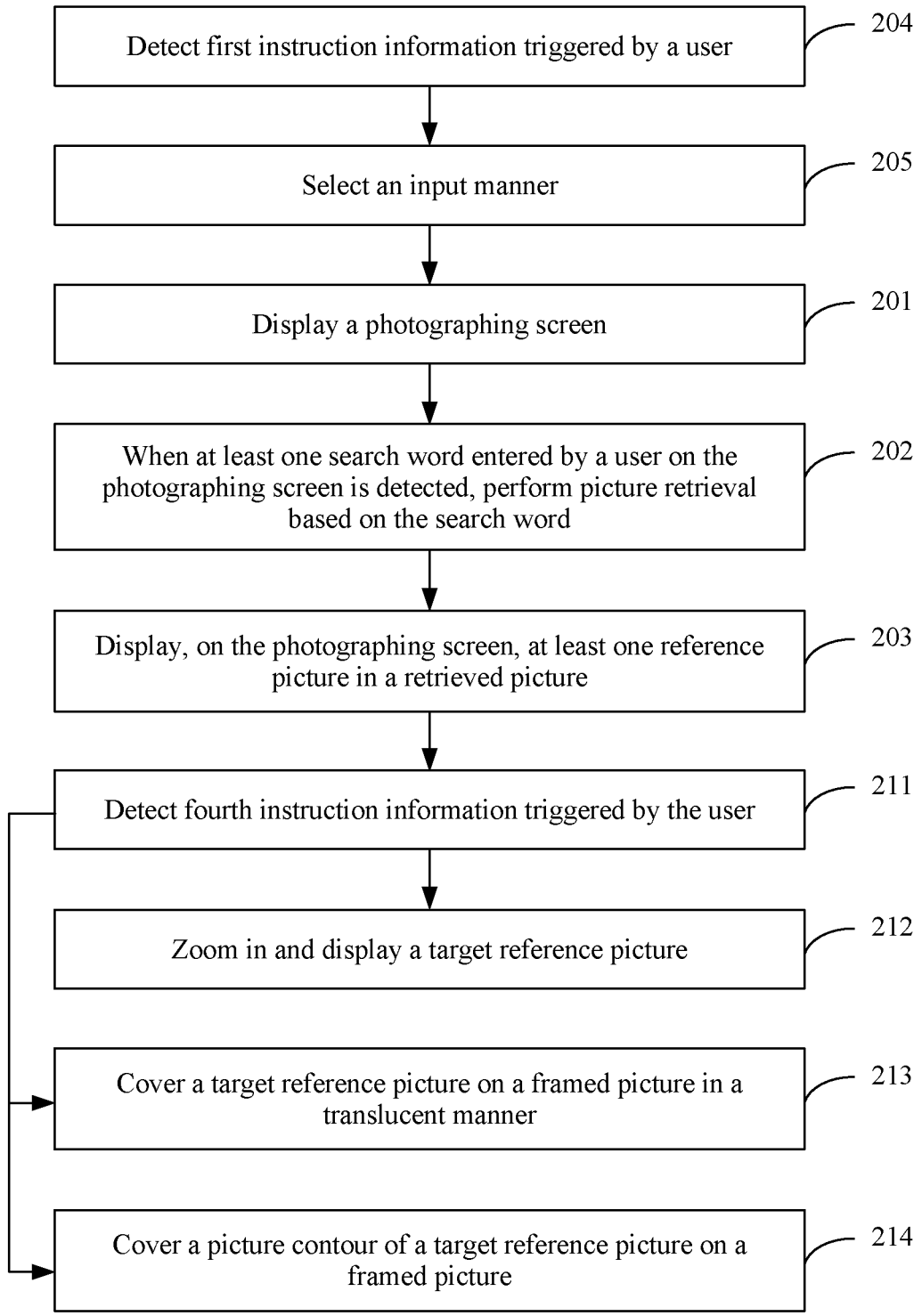
FIG. 6 is a flowchart of another photography guiding method according to an embodiment of this application.

Further, referring to FIG. 6, before detecting the at least one search word entered by the user on the photographing screen in step 202, the photographing device may further perform steps 204 to 205:

204. The photographing device detects first instruction information triggered by the user, where the first instruction information is used to select an input mode of the at least one search word.

205. The photographing device selects the input mode in response to the first instruction information.

The input mode herein may include manual input and voice input, and the manual input includes at least one of a 9-key Pinyin input, a QWERTY Pinyin input, a handwriting input, and a Wubi input. After detecting the first instruction information, the photographing device switches a current input mode to another input mode in response to the first instruction information. In other words, in this embodiment of this application, the photographing device may select different input modes to flexibly switch an input method on the photographing screen, so that the user can enter the search word more conveniently by using different input modes.

Figure 7:
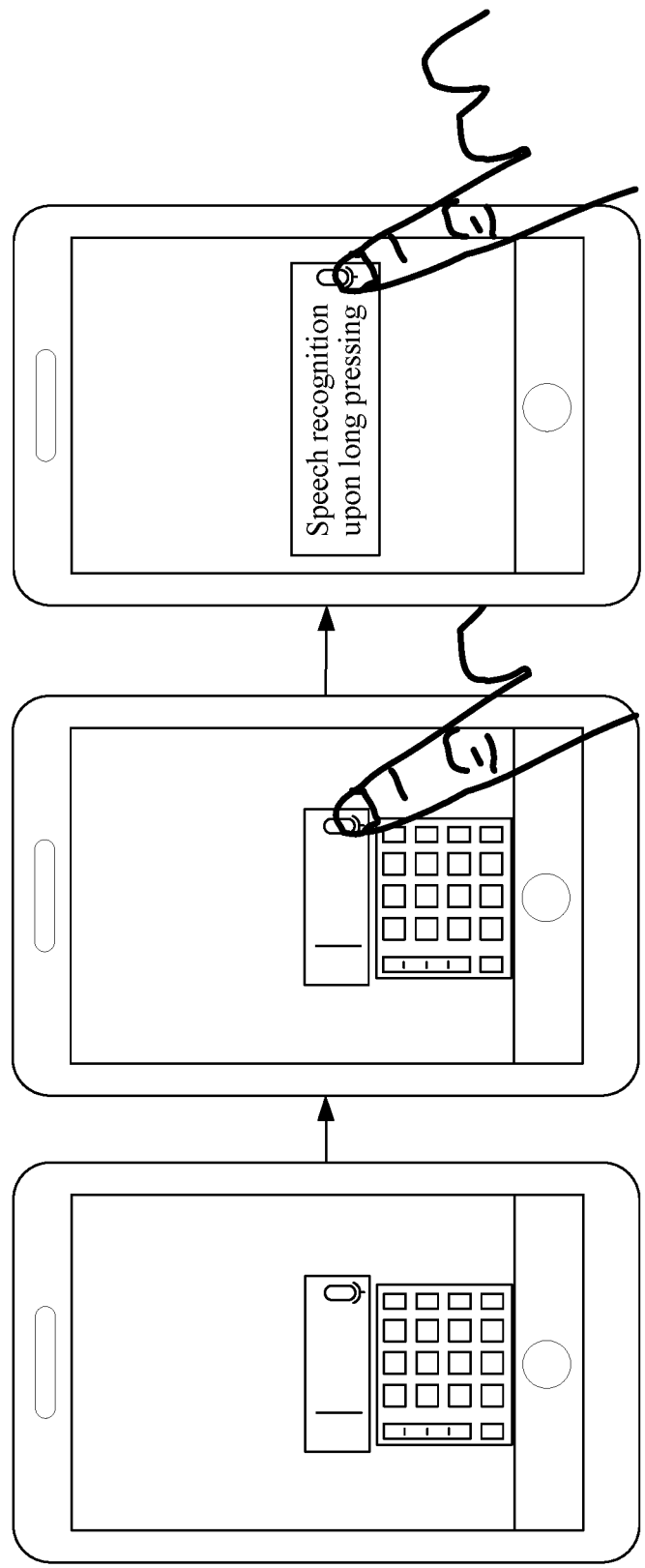
FIG. 7 is a schematic diagram of another photographing screen according to an embodiment of this application.

For example, referring to FIG. 7, a current input mode in the search area is a QWERTY Pinyin input mode, and a microphone is displayed in the search area. When the first instruction information triggered by the user is indication information for selecting a voice input mode, for example, when the user presses the microphone, the photographing device detects the first instruction information, and switches the current QWERTY Pinyin input mode to the voice input mode. In this case, the user may enter the search word by using voice.

In a possible implementation, in step 203, the at least one reference picture displayed on the photographing screen may include a plurality of picture types. The picture types are different categories into which pictures are classified based on a property. There may be a plurality of classification manners of the picture types, and examples are used for description herein. For example, in a classification manner, the picture types may include at least one of people, animal, vegetation, architecture, lifestyle, documentary, travel, folk custom, old photos, cultural relics, natural scenery, landscape, city, house, garden, business, cultural, sanitation, sports, and health. For example, in another classification manner, the picture types may include at least one of scenery, cartoon, celebrity, pet, and game. Alternatively, for example, in another classification manner, the picture types may include at least one of a wedding photo, a head shot, an ID photo, and a photo showing long legs. Alternatively, for example, in another classification manner, the picture types may include at least one of a 1-inch photo, a 2-inch photo, a 5-inch photo, and a 10-inch photo. Alternatively, for example, in another classification manner, the picture types may include an individual photo and a group photo. Alternatively, for example, in another classification manner, the picture types may include a color photograph and a black-and-white photo.

Further, after step 203, the method may include the following steps:

206. The photographing device detects second instruction information triggered by the user, where the second instruction information is used to select at least one picture type.

207. After detecting the second instruction information, the photographing device adjusts the at least one reference picture displayed on the photographing screen, so that adjusted reference picture displayed on the photographing screen matches the selected picture type.

The photographing device adjusts a picture type of the at least one reference picture displayed on the photographing screen to the picture type selected by the user, and can display, on the photographing screen, only a reference picture corresponding to the picture type selected by the user.

Figure 8:
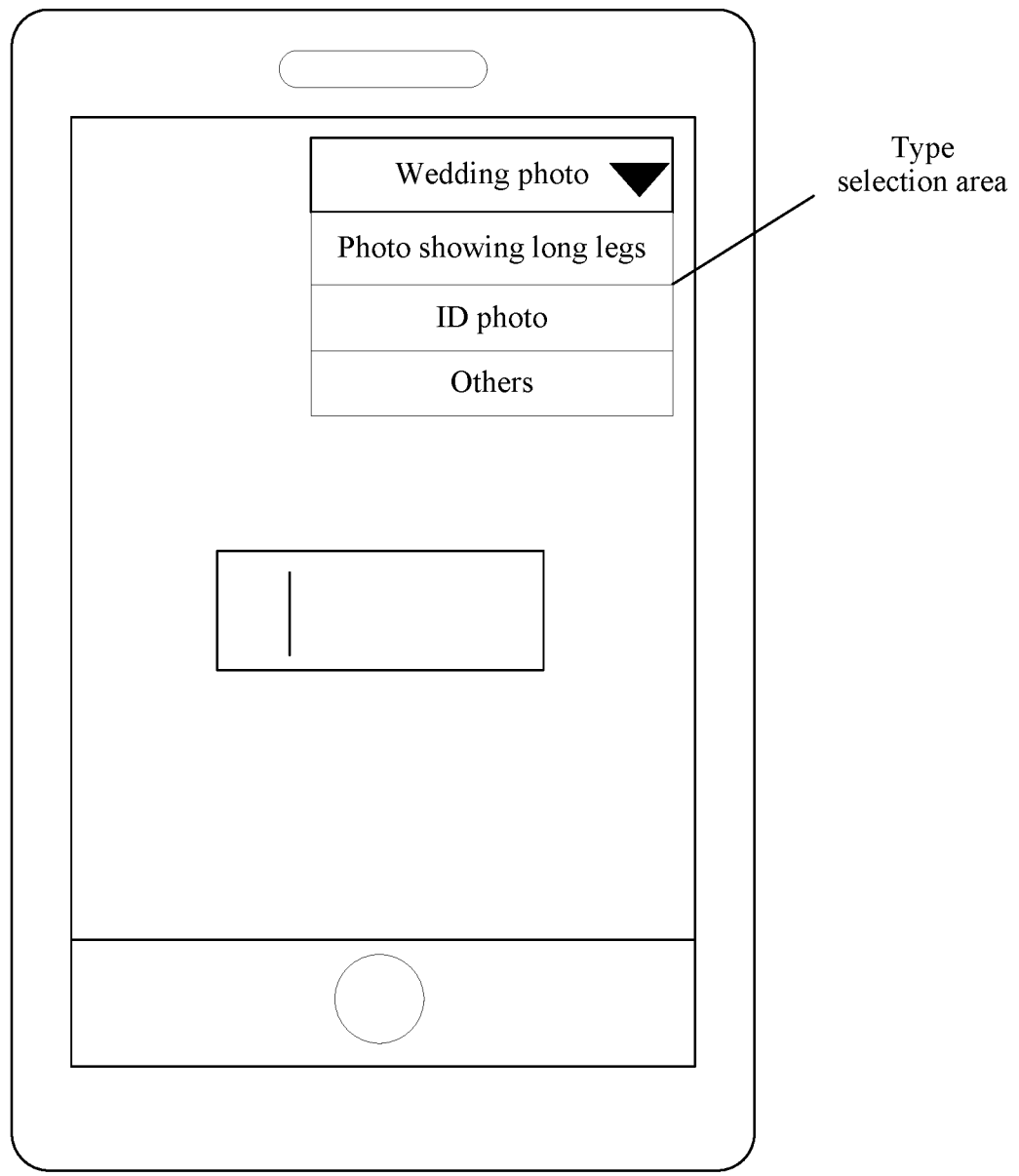
FIG. 8 is a schematic diagram of another photographing screen according to an embodiment of this application.
Figure 9:
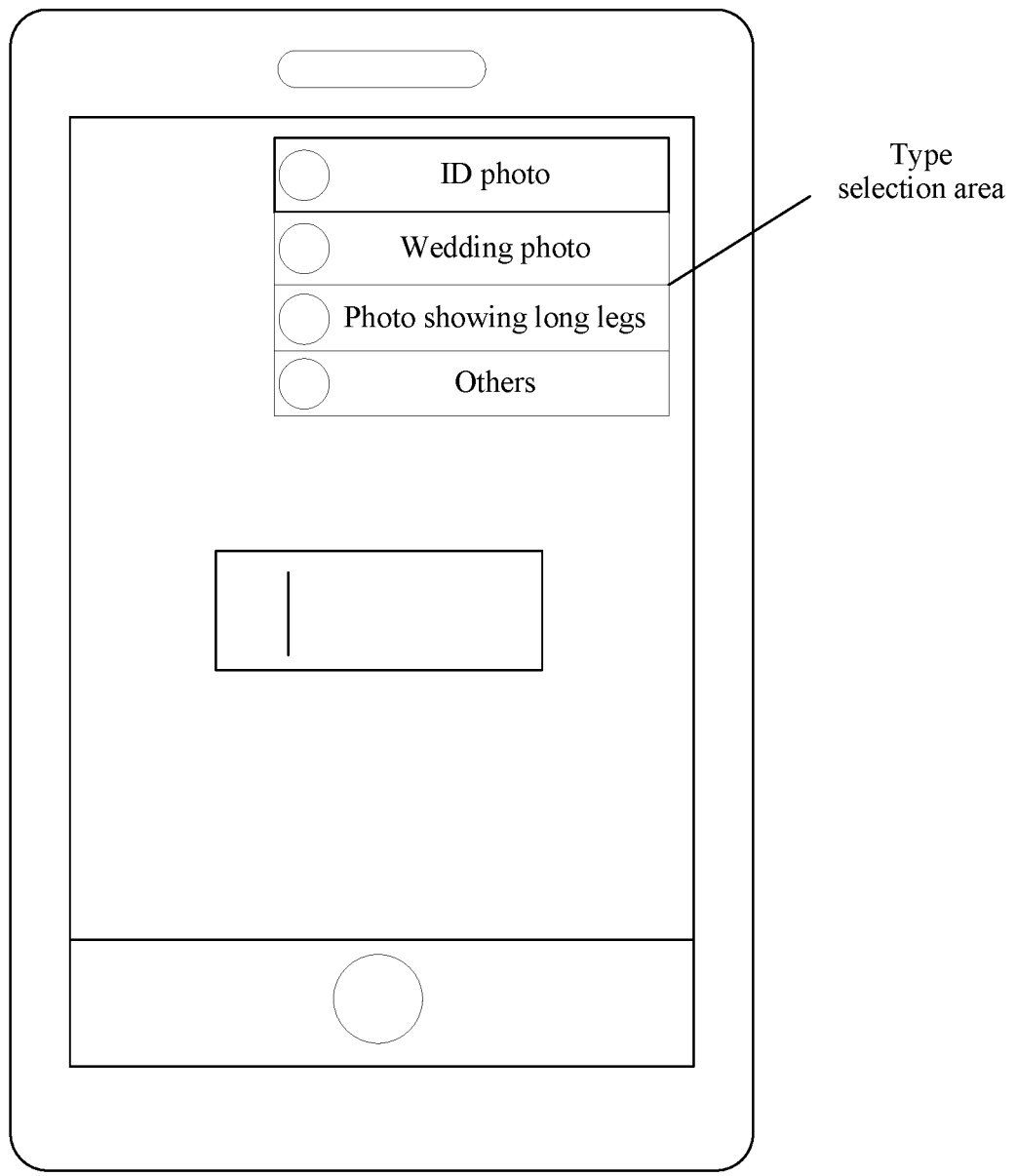
FIG. 9 is a schematic diagram of another photographing screen according to an embodiment of this application.

Specifically, the photographing screen may further include a type selection area. For example, as shown in FIG. 8, the type selection area may include a drop-down list; or as shown in FIG. 9, the type selection area may include a multiple-selection check box. When the user selects at least one picture type by using the drop-down list or the multiple-selection check box, the second instruction information is triggered. For example, when the user selects a picture type "wedding photo" by using the drop-down list shown in FIG. 8, the second instruction information is triggered. After detecting the second instruction information, the photographing device may adjust the at least one reference picture displayed in the reference area of the photographing screen to a reference picture of the picture type "wedding photo".

Alternatively, in a possible implementation, before displaying the at least one reference picture on the photographing screen in step 203, the photographing device may further perform step 208:

208. The photographing device detects second instruction information triggered by the user, where the second instruction information is used to select at least one picture type.

After detecting the second instruction information, that the photographing device displays the at least one reference picture on the photographing screen in step 203 may include: displaying, by the photographing device, at least one reference picture that matches the selected picture type on the photographing screen.

In step 208, the photographing device displays the at least one reference picture on the photographing screen. The picture type of the reference picture includes all picture types that are indicated by the second instruction information and that are selected by the user. For example, when the user selects two picture types "wedding photo" and "photo showing long legs" by using the multiple-selection check box shown in FIG. 8, the second instruction information is triggered. After detecting the second instruction information, the photographing device displays the at least one reference picture in the reference area of the photographing screen, and the picture types of the displayed reference picture include "wedding photo" and "photo showing long legs".

In a possible implementation, the feature of the to-be-photographed picture may further include a picture type. In other words, the search word may further describe a picture type of the to-be-photographed picture. In this way, the user can directly search for a desired picture type by using the search word, so that a reference picture corresponding to the desired picture type is displayed on the photographing screen.

Further, on the basis of the foregoing solution, the method provided in this embodiment of this application may further include the following steps:

209. The photographing device detects third instruction information triggered by the user, where the third instruction information is used to instruct to change the reference picture displayed on the photographing screen.

210. The photographing device changes, in response to the third instruction information, the reference picture displayed on the photographing screen.

Figure 10:
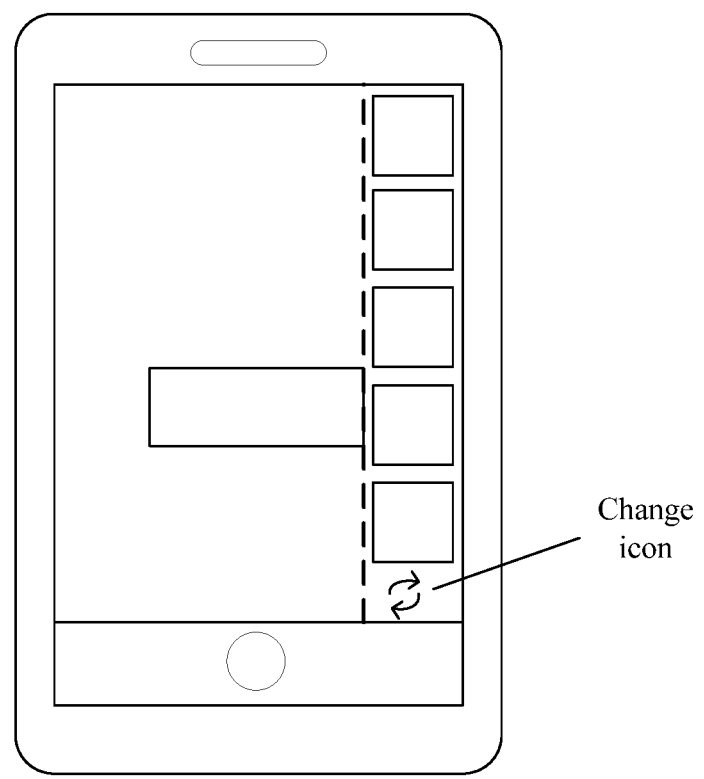
FIG. 10 is a schematic diagram of another photographing screen according to an embodiment of this application.
Figure 11:
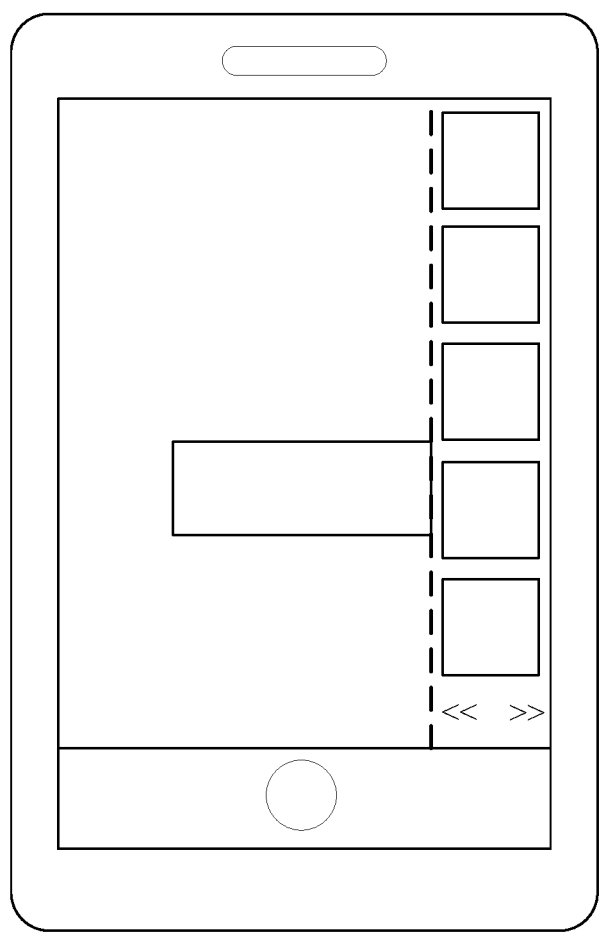
FIG. 11 is a schematic diagram of another photographing screen according to an embodiment of this application.

In this way, the reference picture displayed on the photographing screen is changed, and more reference pictures can be presented to the user. For example, a change icon shown in FIG. 10 may be displayed on the photographing screen. When the user taps the change icon, the third instruction information is triggered, and the photographing device changes current reference pictures displayed in the reference area to another group of reference pictures in response to the third instruction information. For another example, as an alternative solution of the foregoing change icon, a mark "<<" and/or a mark ">>" shown in FIG. 11 may be displayed on the photographing screen. When the user taps the mark "<<", the third instruction information is triggered, and the photographing device changes, in response to the third instruction information, current reference pictures displayed in the reference area to a group of reference pictures displayed on a previous page. Similarly, when the user taps the mark ">>", the third instruction information is triggered, and the photographing device changes, in response to the third instruction information, current reference pictures displayed in the reference area to a group of reference pictures displayed on a next page.

In a possible implementation, when the reference picture displayed on the photographing screen is corresponding to a same picture type, the third instruction information may be used to instruct to change the reference picture displayed on the photographing screen to a reference picture corresponding to another picture type. In this way, each time the displayed reference picture is changed, another picture type of reference picture may be presented to the user for reference.

Further, referring to FIG. 6, on the basis of the foregoing solution, the method provided in this embodiment of this application may further include the following step:

211. The photographing device detects fourth instruction information triggered by the user, where the fourth instruction information is used to instruct to select one of the at least one reference picture displayed on the photographing screen as a target reference picture.

When the photographing device displays a plurality of reference pictures on the photographing screen, the user may select, by triggering the fourth instruction information, a reference picture on the photographing screen as the target reference picture, so as to perform composition photographing by referring to a composition mode of the target reference picture. For example, the fourth instruction information may be "taping to select" a reference picture by the user, and the selected reference picture is the target reference picture.

On the basis of step 211, the method may further include the following step:

212. After detecting the fourth instruction information, the photographing device zooms in and displays the target reference picture.

Figure 12:
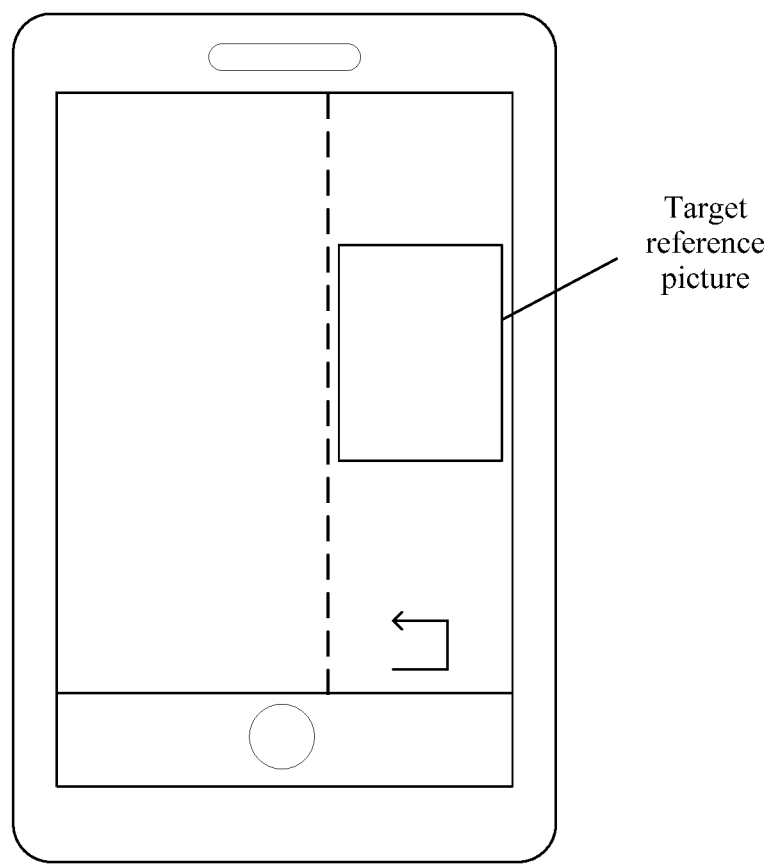
FIG. 12 is a schematic diagram of another photographing screen according to an embodiment of this application.

After detecting the fourth instruction information, the photographing device may zoom in the target reference picture, so as to display the target reference picture more clearly and prominently, so that the user can more conveniently and clearly make reference to the composition mode of the target reference picture, and perform composition photographing. In addition, referring to FIG. 12, when the target reference picture is zoomed in and displayed, the photographing device may also hide or zoom out a reference picture other than the target reference picture on the photographing screen. In addition, a "return" mark may also be set on the photographing screen. When the "return" mark is tapped, a state displayed before the target reference picture is zoomed in may be returned.

Alternatively, on the basis of step 211, the method may further include the following step:

213. After detecting the fourth instruction information, the photographing device covers the target reference picture on a framed picture in a translucent manner.

Figure 13:
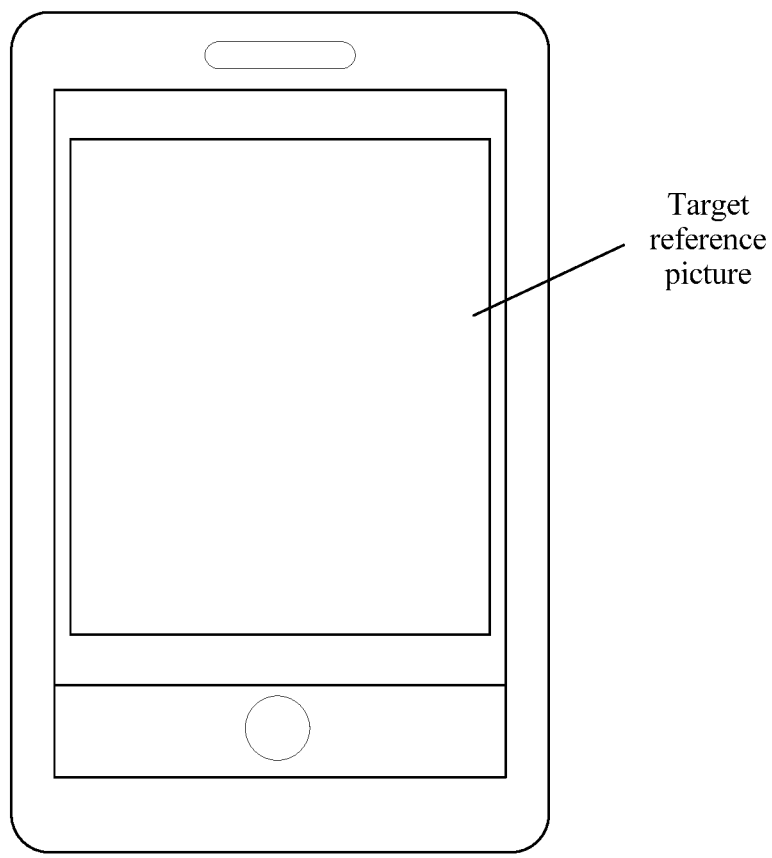
FIG. 13 is a schematic diagram of another photographing screen according to an embodiment of this application.

Referring to FIG. 13, the photographing device fits the target reference picture with the framed picture in the translucent manner, so as to more visually and accurately compare the target reference picture with the framed picture, so that the user can make better reference to the target reference picture for composition photographing, and photograph a more professional picture.

Alternatively, on the basis of step 211, the method may further include the following step:

214. After detecting the fourth instruction information, the photographing device covers a picture contour of the target reference picture on a framed picture.

Figure 14:
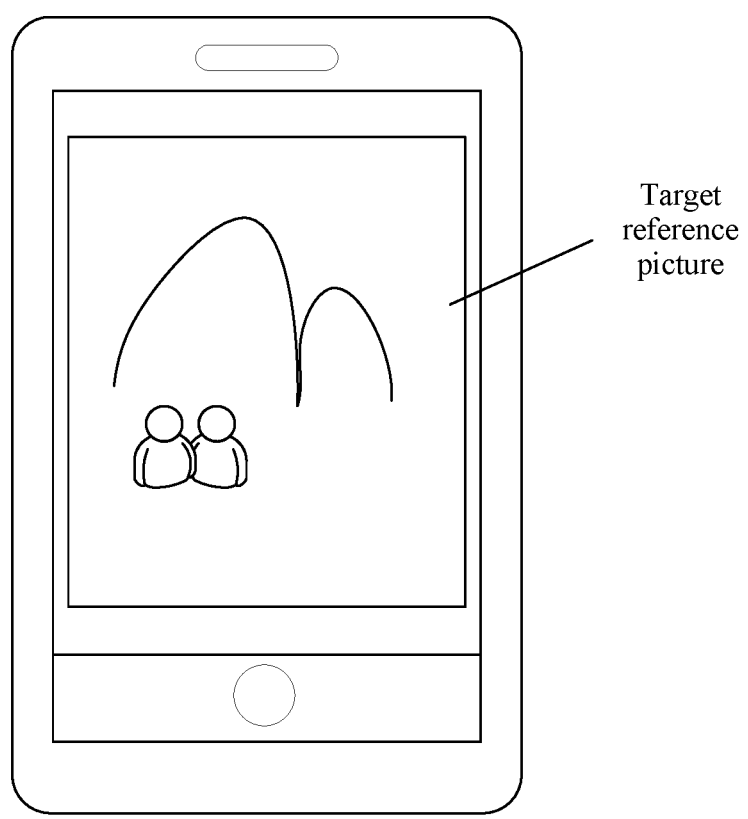
FIG. 14 is a schematic diagram of another photographing screen according to an embodiment of this application.

Referring to FIG. 14, after detecting the fourth instruction information, the photographing device may extract the picture contour of the target reference picture, and cover the picture contour of the target reference picture on the framed picture, so as to more visually and accurately compare a photographed object in the reference target picture with a photographed object in the framed picture, so that the user can make better reference to the target reference picture for composition photographing, and photograph a more professional picture.

Specifically, the photographing device may convert the target reference picture into a two-dimensional greyscale picture, and when a difference between RGB values of adjacent pixels is greater than a preset threshold, the pixels may be determined as pixels of the picture contour. In this way, the photographing device may extract the entire picture contour by traversing all pixels.

Further, after the photographing device determines the target reference picture, the photographing device may also automatically photograph a picture when the framed picture matches the target reference picture. In this way, intelligence of the photographing device can be improved, and user experience can be improved.

In a possible implementation, that the framed picture matches the target reference picture may include that a similarity between a picture contour of the framed picture and the picture contour of the target reference picture is greater than a preset value. The preset value herein may be set according to an actual requirement. In other words, when the picture contour of the framed picture is relatively similar to the picture contour of the target reference picture, for example, when most of the picture contour of the framed picture basically coincides with the picture contour of the target reference picture, or when a trend of the picture contour of the framed picture is approximately the same as that of the picture contour of the target reference picture, or when a trend of a contour of a photographed subject in the framed picture is approximately the same as that of a contour of a photographed subject in the target reference picture, it may be considered that the framed picture matches the target reference picture. A manner in which the photographing device extracts the picture contour of the framed picture is similar to a manner in which the photographing device extracts the picture contour of the target reference picture, and details are not described herein again.

In addition, after the photographing device determines the target reference picture, the method may further include the following step.

215. The photographing device feeds back identification information of the target reference picture to a retrieval database.

The identification information herein may be used to uniquely identify a picture. The photographing device sends the identification information of the target reference picture to the retrieval database, so that the retrieval database may learn that the user selects a preferred reference picture by using the photographing device, and the server can collect data statistics and perform service push more conveniently. The retrieval database herein may be a local database, or may be a database in the server. This is not limited herein.

If the photographing device feeds back the identification information of the target reference picture to the retrieval database, step 203 may specifically include: arranging and displaying, by the photographing device, the reference picture based on a priority sequence, where a priority of a reference picture is proportional to a quantity of times that the reference picture is selected as the target reference picture.

In other words, a larger quantity of times that a reference picture is selected as the target reference picture indicates a higher priority of the reference picture. The retrieval database may collect, based on identification information of target reference pictures sent by a plurality of photographing devices, statics on a quantity of times that a reference picture is selected by the user as the target reference picture, and may provide the photographing device with the quantity of times as well as the reference picture, or may preferably provide the photographing device with a reference picture that is more frequently selected as the target reference picture. Therefore, the photographing device can preferably display the reference picture that is more frequently selected as the target reference picture.

A larger quantity of times that a reference picture is selected as the target reference picture may indicate a larger quantity of users who prefer the reference picture, or indicate that the reference picture is better or more professional. The photographing device preferably displays a reference picture that is more frequently selected as the target reference picture, and may preferably present a picture preferred by more people or a better and more professional reference picture to the user for reference.

In a possible implementation, the retrieved picture may carry a photographing date, and step 203 may specifically include: arranging and displaying, by the photographing device, the reference picture based on a priority sequence, where a reference picture corresponding to a more recent photographing date has a higher priority.

In this way, the photographing device can preferably display a reference picture with a "newer" photographing date for user reference. The reference picture with a "newer" photographing date may have a more innovative composition mode and may be more compatible with a current aesthetic appeal.

Further, the retrieved picture may carry first GPS information corresponding to the reference picture, and the first GPS information indicates photographing location information of the reference picture. In addition, the first GPS information may also be displayed on the reference picture. In addition, second GPS information indicating a current location of the photographing device may also be displayed on the photographing screen.

Figure 15:
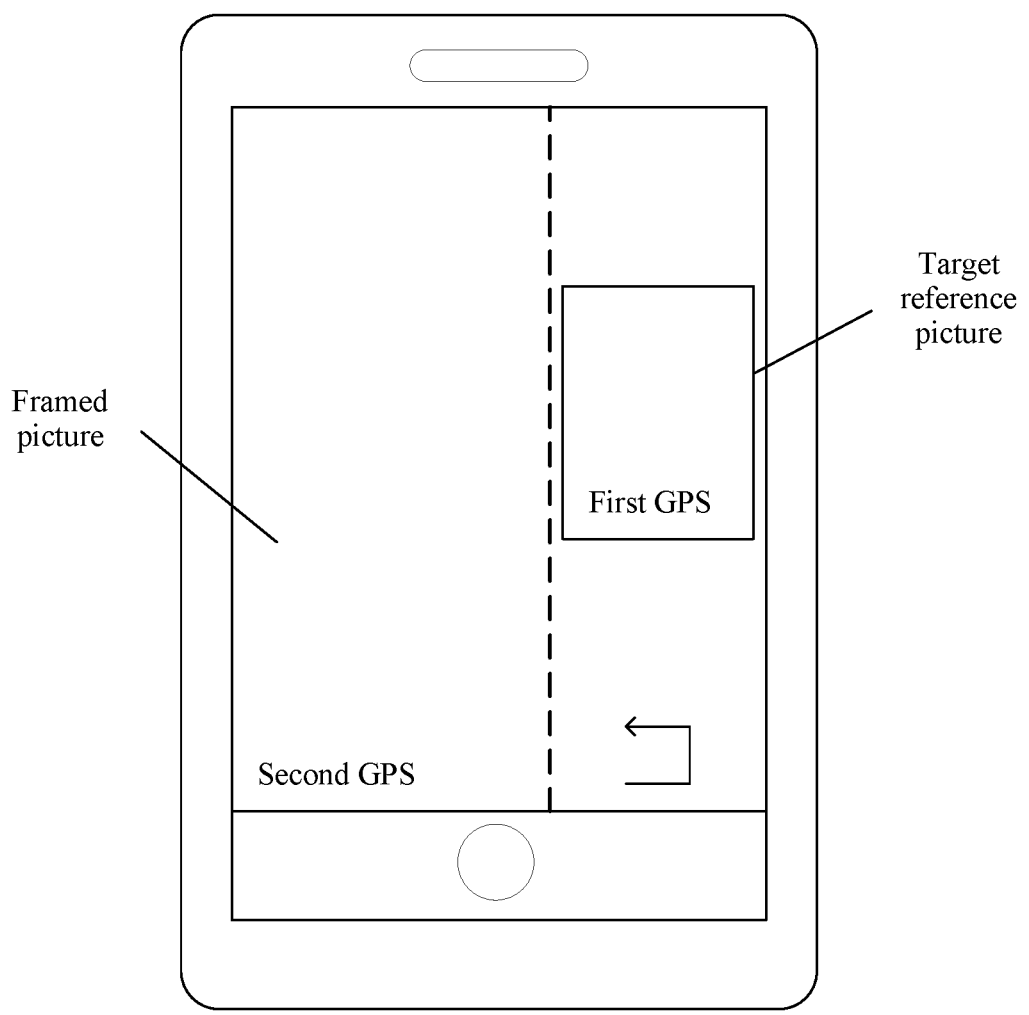
FIG. 15 is a schematic diagram of another photographing screen according to an embodiment of this application.

After the target reference picture is determined, referring to FIG. 15, if the first GPS information is displayed on the target reference picture, and the second GPS information is displayed on the photographing screen, the user may adjust a location of the photographing device based on the first GPS information and the second GPS information. In addition, the method may further include the following step:

216. When second GPS information matches first GPS information, the photographing device displays prompt information.

The matching herein may indicate that a difference between the second GPS information and the first GPS information falls within a specific range, or the second GPS information is consistent with the first GPS information. In this case, the photographing device may display the prompt information, to remind the user that the second GPS information matches the first GPS information, so that the user directly photographs a picture after receiving the prompt information; or the user further adjusts the location of the photographing device, and photographs a picture after the photographing device arrives at a location indicated by the first GPS information.

Alternatively, when the second GPS information matches the first GPS information, the method may further include the following step:

217. The photographing device automatically photographs a picture.

In this way, the photographing device can be more intelligent, and user experience can be improved.

In addition, the server in this embodiment of this application may be a Big Data cloud server, which can provide massive reference pictures, continuously update pictures in the database, and provide a "newer" picture for the user, so that the user performs composition photographing based on a latest reference picture, so as to improve a photographing level of the user.

The foregoing mainly describes the solutions provided in the embodiments of the present invention from a perspective of the terminal device. It may be understood that, to implement the foregoing functions, the terminal device includes corresponding hardware structures and/or software modules for performing the functions. A person of ordinary skill in the art should be easily aware that, the algorithm steps in the examples described with reference to the embodiments disclosed in the present invention may be implemented by hardware or a combination of hardware and computer software in this application. Whether the functions are performed by hardware or computer software driving hardware depends on particular applications and design constraint conditions of the technical solutions. A person skilled in the art may use different methods to implement the described functions for each particular application, but it should not be considered that the implementation goes beyond the scope of the present invention.

In the embodiments of the present invention, the terminal may be divided into function modules based on the foregoing method examples. For example, each function module may be obtained through division for a corresponding function, or two or more functions may be integrated into one processing module. The integrated module may be implemented in a form of hardware, or may be implemented in a form of a functional module of software. It should be noted that the module division in the embodiments of the present invention is an example, and is merely logical function division. There may be another division manner in an actual implementation.

Figure 16:
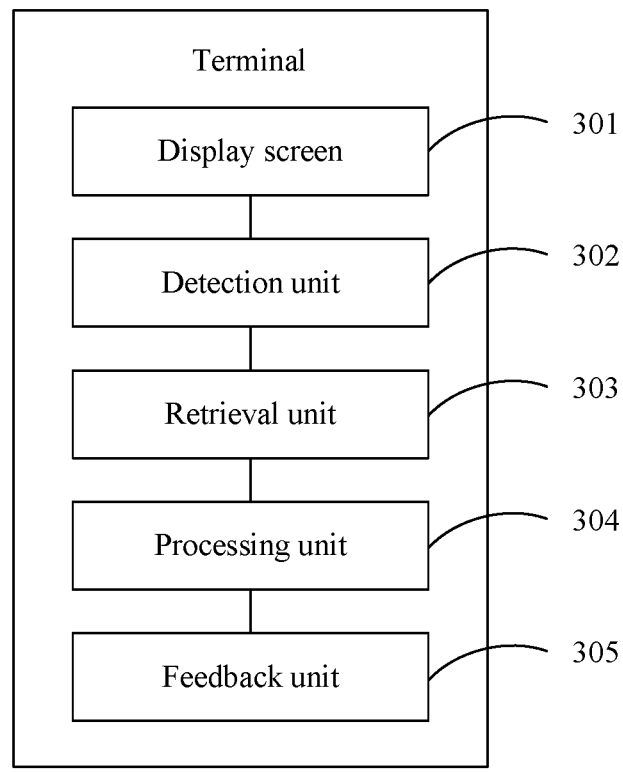
FIG. 16 is a schematic structural diagram of a terminal according to an embodiment of this application.

When each function module is obtained through division based on a corresponding function, FIG. 16 is a possible schematic composition diagram of the terminal in the foregoing embodiments. As shown in FIG. 16, the terminal may include a display screen 301, a detection unit 302, a retrieval unit 303, and a processing unit 304, and a feedback unit 305.

The display screen 301 is configured to support the terminal in performing step 201 and step 203 in the photography guiding method shown in FIG. 2 and FIG. 6, and/or configured to support one or more other processes of the technology described in this specification.

The detection unit 302 is configured to support the terminal in performing step 202 in the photography guiding method shown in FIG. 2 and FIG. 6 and step 204 and step 211 in the photography guiding method shown FIG. 6, and/or configured to support one or more other processes of the technology described in this specification.

The retrieval unit 303 is configured to support the terminal in performing step 202 in the photography guiding method shown in FIG. 2 and FIG. 6, and/or configured to support one or more other processes of the technology described in this specification.

The processing unit 304 is configured to support the terminal in performing step 205, step 212, step 213, and step 214 in the photography guiding method shown in FIG. 6, and/or configured to support one or more other processes of the technology described in this specification.

The feedback unit 305 is configured to support the terminal in feeding back identification information of a target reference picture to a retrieval database, and/or configured to support one or more other processes of the technology described in this specification.

It should be noted that all related content of steps in the foregoing method embodiments may be cited in function descriptions of corresponding function modules. Details are not described herein again.

The terminal provided in this embodiment of the present invention is configured to perform the foregoing photography guiding method, and therefore can achieve a same effect as the foregoing photography guiding method.

Figure 17:
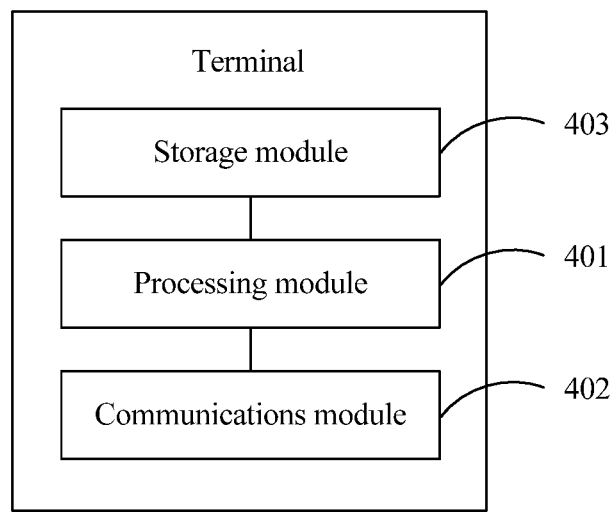
FIG. 17 is a schematic structural diagram of another terminal according to an embodiment of this application.

When an integrated unit is used, FIG. 17 is another possible schematic composition diagram of the terminal in the foregoing embodiments. As shown in FIG. 17, the terminal includes a processing module 401, a communications module 402, and a storage module 403.

The processing module 401 is configured to control and manage an action of the terminal. For example, the processing module 401 is configured to support the terminal in performing step 202 in the photography guiding method shown in FIG. 2, and step 204, step 205, step 211, step 212, step 213, and step 214 in the photography guiding method shown in FIG. 6, and/or configured to support one or more other processes of the technology described in this specification. The communications module 402 is configured to support the terminal in communicating with another network entity. The storage module 403 is configured to store program code and data of the terminal.

The processing module 401 may be a processor or a controller. The processor may implement or execute various examples of logical blocks, modules, and circuits that are described with reference to the contents disclosed in the present invention. The processor may also be a combination of computing functions, for example, a combination of one or more microprocessors or a combination of a digital signal processor (Digital Signal Processor, DSP) and a microprocessor. The communications module 402 may be a transceiver, a transceiver circuit, a communications interface, or the like. The storage module 403 may be a memory.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or part of the functions described above.

Figure 18:
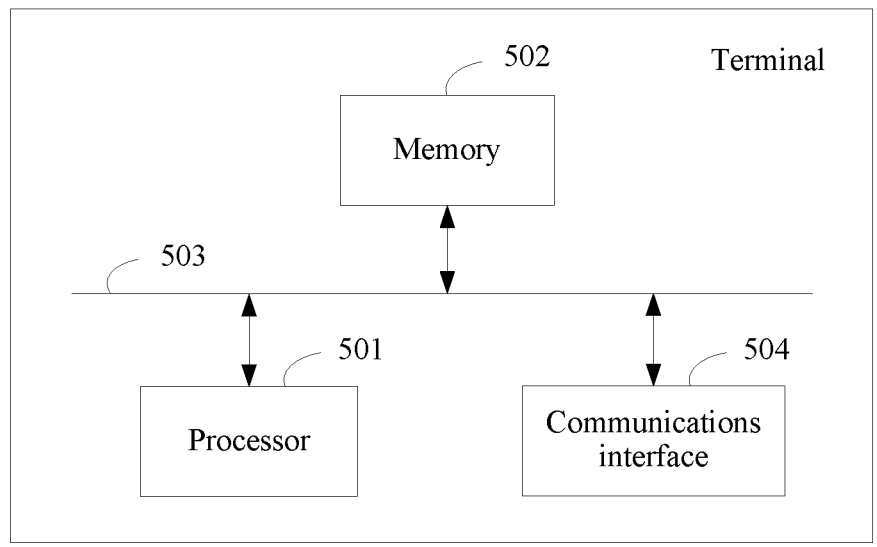
FIG. 18 is a schematic structural diagram of another terminal according to an embodiment of this application.

FIG. 18 is a schematic structural diagram of another terminal according to an embodiment of the present invention. The terminal may include a processor 501, a memory 502, a bus 503, and a communications interface 504. The processor 501, the memory 502, and the communications interface 504 are connected by using the system bus 503. The memory 502 is configured to store a computer-executable instruction. When the terminal runs, the processor 501 executes the computer-executable instruction stored in the memory 502, so that the terminal performs the photography guiding method provided in the embodiments of the present invention. For details of the photography guiding method, refer to the following descriptions and related descriptions in the accompanying drawings. Details are not described herein again.

This embodiment of this application further provides a computer storage medium. The storage medium may be the memory 502.

An embodiment of this application further provides a computer program product that includes an instruction, and when the computer program product runs on a computer, the computer can perform the photography guiding method performed by the terminal.

Figure 19:
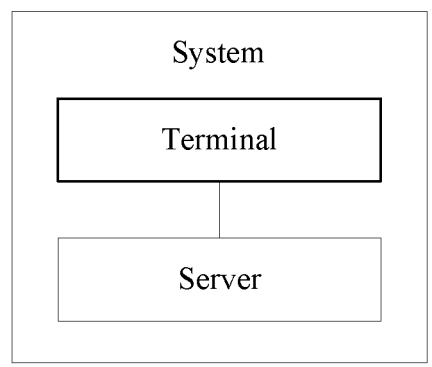
FIG. 19 is a schematic structural diagram of a system according to an embodiment of this application.

An embodiment of this application further provides a communications system. Referring to FIG. 19, the system includes a terminal and a server that can implement the foregoing photography guiding method. The server may be configured to receive at least one search word sent by a photographing device, where the at least one search word is used to describe a feature of a to-be-photographed picture; perform picture retrieval based on the search word; and send a retrieved picture to the photographing device, where the retrieved picture is used to provide a reference picture for guiding a user to perform composition photographing.

Specifically, the server may include a receiving unit, configured to receive at least one search word sent by the photographing device, where the at least one search word is used to describe a feature of a to-be-photographed picture; a retrieval unit, configured to perform picture retrieval based on the search word; and a sending unit, configured to: send a retrieved picture to the photographing device, where the picture is used to provide a reference picture for guiding the user to perform composition photographing.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk), or the like.

Although this application is described with reference to the embodiments, in a process of implementing this application that claims protection, a person skilled in the art may understand and implement other variations of the disclosed embodiments by viewing the accompanying drawings, disclosed content, and the accompanying claims. In the claims, "comprising" (comprising) does not exclude another component or another step, and "a" or "one" does not exclude a case of a plurality of A single processor or another unit may implement several functions enumerated in the claims. The fact that some measures are recited in mutually different dependent claims does not indicate that a combination of these measures cannot bring better effects.

Although this application is described with reference to specific features and the embodiments thereof, obviously, various modifications and combinations may be made to them without departing from the spirit and scope of this application. Correspondingly, the specification and accompanying drawings are merely examples for description of this application defined by the claims, and are intended to cover any of or all modifications, variations, combinations or equivalents within the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A terminal, comprising:
a display screen, configured to display a photographing screen;
a detection unit, configured to detect at least one search word entered by a user through a voice; and
a retrieval unit, configured to perform a picture retrieval based on the at least one search word detected by the detection unit, wherein the at least one search word is used to describe a feature of a to-be-photographed picture,
wherein the display screen is further configured to display, on the photographing screen, a plurality of reference pictures corresponding to the picture retrieval,
wherein at least one of the plurality of reference pictures is selected as a target reference picture that covers the to-be-photographed picture in a translucent manner,
wherein the displaying of the plurality of reference pictures by the display screen includes arranging and displaying the plurality of reference pictures on the photographing screen according to a priority sequence, and
wherein the priority sequence uses a priority of each one of the plurality of reference pictures that is proportional to a quantity of times that each one of the plurality of reference pictures is selected as the target reference picture.

2. The terminal according to claim 1, wherein the feature of the to-be-photographed picture includes at least one of a feature of a photographed object, a photographing location, a photographing time, and a photographing scene, and the feature of the photographed object includes at least one of a type, a quantity, and a state of the photographed object.

3. The terminal according to claim 2,
wherein the detection unit is further configured to detect third instruction information triggered by the user, where the third instruction information is used to instruct to change at least one of the plurality of reference pictures displayed on the photographing screen, and
wherein the terminal further comprises a processing unit configured to change, in response to the third instruction information detected by the detection unit, the at least one of the plurality of reference pictures displayed on the photographing screen.

4. The terminal according to claim 3,
wherein the feature of the to-be-photographed picture includes a picture type, and
wherein the third instruction information is used to instruct to change the plurality of reference pictures displayed on the photographing screen from a first type of the picture type to another plurality of reference pictures corresponding to a second type of the picture type.

5. The terminal according to claim 1,
wherein the detection unit is further configured to detect first instruction information triggered by the user, the first instruction information being used to select an input mode of the at least one search word, and
wherein the terminal further comprises a processing unit configured to select a voice input in response to the first instruction information.

6. The terminal according to claim 1,
wherein the detection unit is further configured to detect second instruction information triggered by the user, the second instruction information being used to select at least one picture type, and
wherein after the detection unit detects the second instruction information and a selected picture type, the displaying of the at plurality of reference pictures by the display screen includes displaying at least one reference picture that matches the selected picture type on the photographing screen.

7. The terminal according to claim 1, wherein the feature of the to-be-photographed picture includes a picture type.

8. The terminal according to claim 7,
wherein the plurality of reference pictures displayed on the photographing screen corresponds to a same picture type.

9. The terminal according to claim 8, wherein the terminal further comprises a feedback unit configured to feed back identification information of the target reference picture to a retrieval database.

10. The terminal according to claim 1,
wherein first global positioning system (GPS) information is displayed on the target reference picture, second GPS information is displayed on the photographing screen, the first GPS information is photographing location information of the target reference picture, the second GPS information is location information of the terminal, and
wherein the display screen is further configured to display prompt information when the second GPS information matches the first GPS information.

11. A non-transitory computer-readable medium storing computer instructions for execution by one or more processors, wherein the computer instructions instruct the one or more processors to perform the operations of:
displaying a photographing screen;
detecting at least one search word entered by a user through a voice input;
performing a picture retrieval based on the at least one search word detected by the detection unit, wherein the at least one search word is used to describe a feature of a to-be-photographed picture; and
displaying a plurality of reference pictures corresponding to the picture retrieval,
wherein at least one of the plurality of reference pictures is selected as a target reference picture that covers the to-be-photographed picture in a translucent manner,
wherein the displaying of the plurality of reference pictures by the display screen includes arranging and displaying the plurality of reference pictures on the photographing screen according to a priority sequence, and
wherein the priority sequence uses a priority of each one of the plurality of reference pictures that is proportional to a quantity of times that each one of the plurality of reference pictures is selected as the target reference picture.

12. The non-transitory computer-readable medium according to claim 11, wherein the feature of the to-be-photographed picture includes at least one of a feature of a photographed object, a photographing location, a photographing time, and a photographing scene, and the feature of the photographed object includes at least one of a type, a quantity, and a state of the photographed object.

13. The non-transitory computer-readable medium according to claim 12, wherein the operations further include:
detecting third instruction information triggered by the user, wherein the third instruction information is used to instruct to change at least one of the plurality of reference pictures displayed on the photographing screen; and
changing, in response to the third instruction information, the at least one of the plurality of reference pictures displayed on the photographing screen.

14. The non-transitory computer-readable medium according to claim 13,
wherein the feature of the to-be-photographed picture includes a picture type, and
wherein the third instruction information is used to instruct to change the plurality of reference pictures displayed on the photographing screen from a first type of the picture type to another plurality of reference pictures corresponding to a second type of the picture type.

15. The non-transitory computer-readable medium according to claim 11, wherein the operations further include:
before the detecting of the at least one search word, first detecting first instruction information triggered by the user, the first instruction information being used to select an input mode of the at least one search word; and
selecting the voice input in response to the first instruction information.

16. The non-transitory computer-readable medium according to claim 11, wherein the operations further include detecting second instruction information triggered by the user, wherein the second instruction information is used to select at least one picture type, and
wherein after the detecting of the second instruction information and a selected picture type, the displaying of the plurality of reference pictures includes displaying the at least one reference picture that matches the selected picture type on the photographing screen.

17. The non-transitory computer-readable medium according to claim 11, wherein the feature of the to-be-photographed picture includes a picture type.

18. The non-transitory computer-readable medium according to claim 11,
wherein the plurality of reference pictures displayed on the photographing screen correspond to a same picture type.

19. The non-transitory computer-readable medium according to claim 11, wherein the operations further include feeding back identification information of the target reference picture to a retrieval database.

20. The non-transitory computer-readable medium according to claim 11, wherein the operations further include:
displaying first global positioning system (GPS) information on the target, the first GPS information being photographing location information of the target reference picture;
displaying second GPS information on the photographing screen, the second GPS information being location information of the photographing device; and
displaying prompt information when the second GPS information matches the first GPS information.

* * * * *